D. L. BENSON.
Rotary Harrows.

No. 149,371. Patented April 7, 1874.

WITNESSES.
E. Wolff
[signature]

INVENTOR.
D. L. Benson
BY [signature]
ATTORNEYS.

UNITED STATES PATENT OFFICE.

DAVID L. BENSON, OF TAMAROA, ILLINOIS.

IMPROVEMENT IN ROTARY HARROWS.

Specification forming part of Letters Patent No. 149,371, dated April 7, 1874; application filed December 20, 1873.

*To all whom it may concern:*

Figure 1:
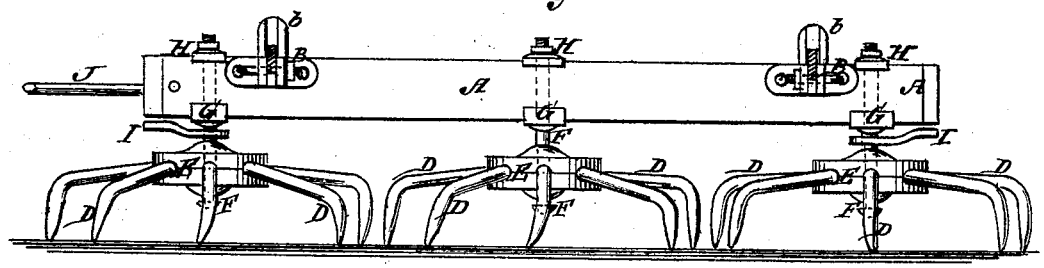
Figure 2:
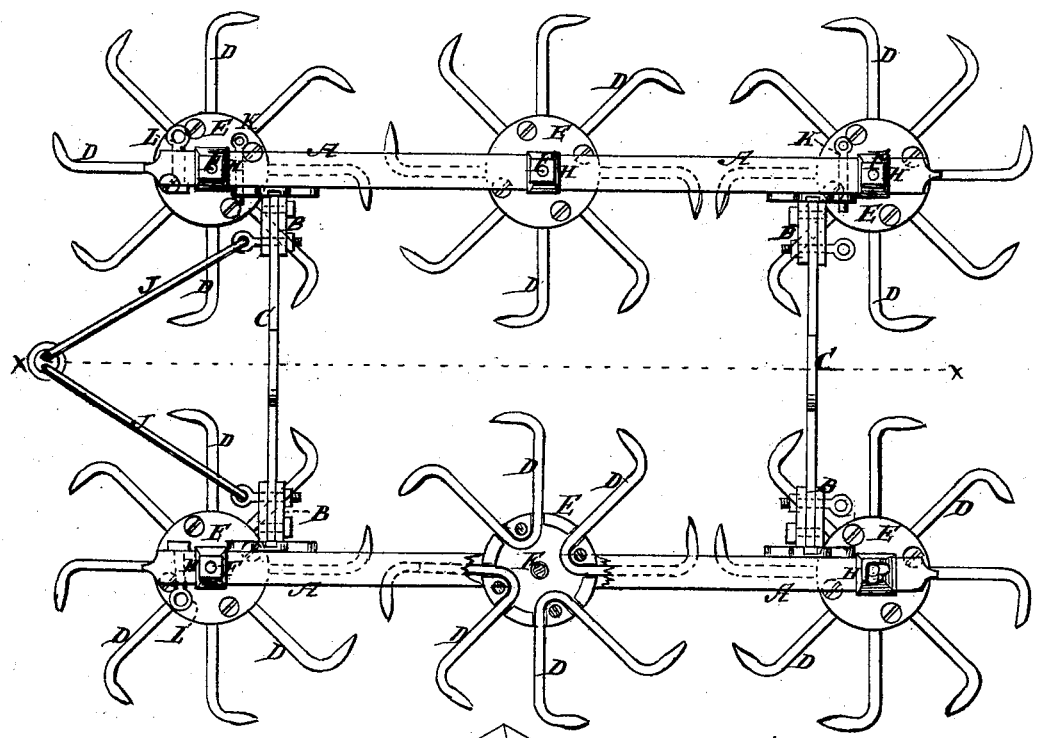
Figure 3:
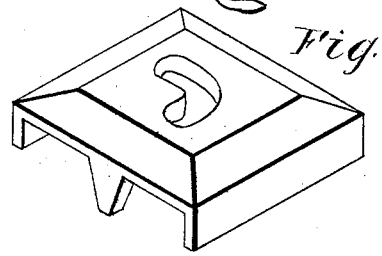

Be it known that I, DAVID L. BENSON, of Tamaroa, in the county of Perry and State of Illinois, have invented a new and useful Improvement in Tarantula or Rotating Harrow, of which the following is a specification:

Figure 1 is a vertical section of my improved harrow taken through the line $x$ $x$, Fig. 2. Fig. 2 is a top view of the same.

Similar letters of reference indicate corresponding parts.

The invention will first be fully described, and then pointed out in the claims.

A are two bars or beams, to the inner sides of which, near their ends, are attached brackets B, which are slotted longitudinally to receive the ends of the cross-bars C, which are secured to said brackets by rivets or bolts and eyebolts, two to each bracket, so that the connection may be made rigid by inserting both bolts or rivets, and be made flexible by detaching one of said bolts. The brackets B are made with upwardly-projecting arms $b$ grooved longitudinally upon their inner sides, so that when the wheels are brought into a vertical position, the beams A being turned one-quarter of a revolution, the grooved arms will rest upon the upper edges of the cross-bars and give stiffness to the connection. The bars C are made with a bow or arch in their middle part, to enable the harrow to be used for cultivating corn or other plants planted in rows. D are the harrow teeth, which are made in U shape, and with their ends bent downward and to one side, as shown in Figs. 1 and 2. E are hubs, which are made in two parts secured to each other by four bolts, which also pass through the bends of the teeth D, as shown in Fig. 2. The adjacent faces of the parts of the hubs around each of the bolts that secure said parts to each other are grooved to receive the bends of the teeth D, which are thus securely clamped and held. Through the center of the hubs E is formed a hole to receive the journal formed upon the lower end of the bolt F, which journal is made longer than the hubs E, so that the wheels may have a play to enable them to adapt themselves to unevenness of the surface of the ground. The upper ends of the bolts F pass up through holes in the beams A, and are secured by nuts. The bolts F have a shoulder formed upon their middle part, which rests upon a bearing, G, placed upon the lower side of the beams A. The nuts of the bolts F rest upon the bearing H attached to the upper sides of the beams A. The bearing H is kept from turning by flanges formed along its side edges to overlap the sides of the beams A, and from longitudinal movement by a point or projection formed upon its lower side, and which enters a hole in the upper side of the beams A.

The machine is used as a cultivator when the draft is applied as shown in the drawing; but it may be used as a harrow when the draft bars or rods J are applied at right angles to the beams A. Nothing else is required to convert the machine from a harrow to a cultivator, and vice versa, save this change in the draft attachment.

The right-angled slots in the bearings H are to enable the bolts F to be set inclined, to cause the rear harrow-teeth to take deeper into the earth than those on the front side. The draft-bars J connect with the harrow through the medium of suitable draft-irons I or edge-bolts K, according to the required use of the machine. When the beams are turned so that the arms $b$ rest on the bars C, as above described, the wheels will be vertical, and thus adapted to act as transporting-wheels in passing from place to place.

Having thus described my invention, I claim as new and desire to secure by Letters Patent—

1. The harrow-wheels formed of the hubs E, made in two parts, and the U-shaped harrow-teeth D, in substantially the manner herein shown and described.

2. The bearing H, made with a right-angled slot, in combination with the beam A and the bolt F that forms the journal of the harrow-wheels D E, substantially as and for the purpose herein set forth and described.

DAVID L. BENSON.

Witnesses:
M. L. JONES,
ALVAH BLANCHARD.